US009772239B2

(12) United States Patent
Matsui et al.

(10) Patent No.: US 9,772,239 B2
(45) Date of Patent: Sep. 26, 2017

(54) TORQUE DETECTION APPARATUS

(71) Applicant: JTEKT CORPORATION, Osaka-shi, Osaka (JP)

(72) Inventors: Yusuke Matsui, Shiki-gun (JP); Kensaku Hotta, Kashihara (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 15/068,277

(22) Filed: Mar. 11, 2016

(65) Prior Publication Data
US 2016/0273982 A1 Sep. 22, 2016

(30) Foreign Application Priority Data

Mar. 20, 2015 (JP) ................................. 2015-058088

(51) Int. Cl.
G01L 3/10 (2006.01)
B62D 6/10 (2006.01)

(52) U.S. Cl.
CPC ................ *G01L 3/104* (2013.01); *B62D 6/10* (2013.01)

(58) Field of Classification Search
CPC ..................................................... G01L 3/108
See application file for complete search history.

(56) References Cited

U.S. PATENT DOCUMENTS

| 8,957,678 | B2* | 2/2015 | Oota | G01L 3/104 |
| | | | | 324/207.2 |
| 9,255,857 | B2* | 2/2016 | Hotta | B62D 5/0481 |
| 9,378,881 | B2* | 6/2016 | Matsui | B62D 6/10 |
| 9,395,255 | B2* | 7/2016 | Kataoka | B62D 6/10 |
| 2002/0021199 | A1* | 2/2002 | Serino | G01L 3/101 |
| | | | | 336/84 M |
| 2011/0232988 | A1* | 9/2011 | Aoki | G01L 25/003 |
| | | | | 180/446 |

FOREIGN PATENT DOCUMENTS

| EP | 1 167 935 A2 | 1/2002 |
| EP | 2 833 110 A1 | 2/2015 |
| JP | 2007-220478 A | 8/2007 |

OTHER PUBLICATIONS

Aug. 22, 2016 Extended European Search Report issued in Patent Application No. 16159817.2.

* cited by examiner

*Primary Examiner* — Lisa Caputo
*Assistant Examiner* — Tran M Tran
(74) *Attorney, Agent, or Firm* — Oliff PLC

(57) ABSTRACT

A torque detection apparatus includes a magnetic element that outputs a signal corresponding to a magnetic flux from a magnetic circuit including a magnetic yoke. The torque detection apparatus further includes a signal retrieval member electrically connected to the magnetic element, and a unit housing formed of resin and molded integrally with the magnetic element and the signal retrieval member so as to cover the magnetic element and the signal retrieval member. The unit housing includes a body portion provided with an internal space in which the magnetic yoke is housed, and a connector portion provided with an internal space in which an end of the signal retrieval member exposed from the resin is disposed. In the unit housing, a communication path is formed through which the internal space is in communication with the internal space.

5 Claims, 7 Drawing Sheets

TORQUE DETECTION APPARATUS

INCORPORATION BY REFERENCE

The disclosure of Japanese Patent Application No. 2015-058088 filed on Mar. 20, 2015 including the specification, drawings and abstract, is incorporated herein by reference in its entirety.

BACKGROUND OF THE INVENTION

1. Field of the Invention

The invention relates to a torque detection apparatus.

2. Description of the Related Art

Japanese Patent Application Publication No. 2007-220478 (JP 2007-220478 A) discloses an airtightness testing process for housings such as a motor housing and a gear housing. A wire harness used for a torque sensor and the like extends from the housing. The wire harness has a connector coupled to an end of a wire bundle with a plurality of covered wires. In the airtightness testing process, with the connector closed with a cover, airtightness is tested based on leakage of air supplied to the interior of the motor housing.

As a housing used for the torque sensor and the like, a unit housing may be adopted which is formed integrally with the connector by resin molding or the like. In this unit housing, the interior of a housing portion is separated from the interior of a connector portion by the resin. To test the unit housing for airtightness using the airtightness test described in JP 2007-220478 A, the airtightness test needs to be conducted on each of the housing and connector portions.

SUMMARY OF THE INVENTION

It is an object of the invention to provide a torque detection apparatus that enables a reduction in man-hour of an airtightness test on a unit housing.

According to an aspect of the invention, the torque detection apparatus includes: a permanent magnet in which magnet poles are arranged in a circumferential direction; a magnetic yoke formed of a magnetic substance and disposed in a magnetic field formed by the permanent magnet so as to surround the permanent magnet, the magnetic yoke rotating relative to the permanent magnet to change a relative phase between the permanent magnet and the magnetic yoke; a magnetic element disposed around the magnetic yoke to output a signal corresponding to a magnetic flux from a magnetic circuit including the permanent magnet and the magnetic yoke; a signal retrieval member electrically connected to the magnetic element; and a unit housing that is formed of resin, houses the permanent magnet and the magnetic yoke, and that is molded integrally with the magnetic element and the signal retrieval member so as to cover the magnetic element and the signal retrieval member. The unit housing includes a body portion provided with an internal space in which the permanent magnet and the magnetic yoke are housed, and a connector portion provided with an internal space in which an end of the signal retrieval member exposed from the resin is disposed. In the unit housing, a communication path is formed through which the internal space in the body portion is in communication with the internal space in the connector portion.

In the torque detection apparatus according to the aspect, the internal space in the body portion of the unit housing is in communication with the internal space in the connector portion of the unit housing through the communication path. Thus, whether or not the unit housing as a whole is appropriately airtight can be determined by one test. This enables a reduction in man-hour of the airtightness test on the unit housing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described in detail below with reference to the attached drawings.

Figure 1:
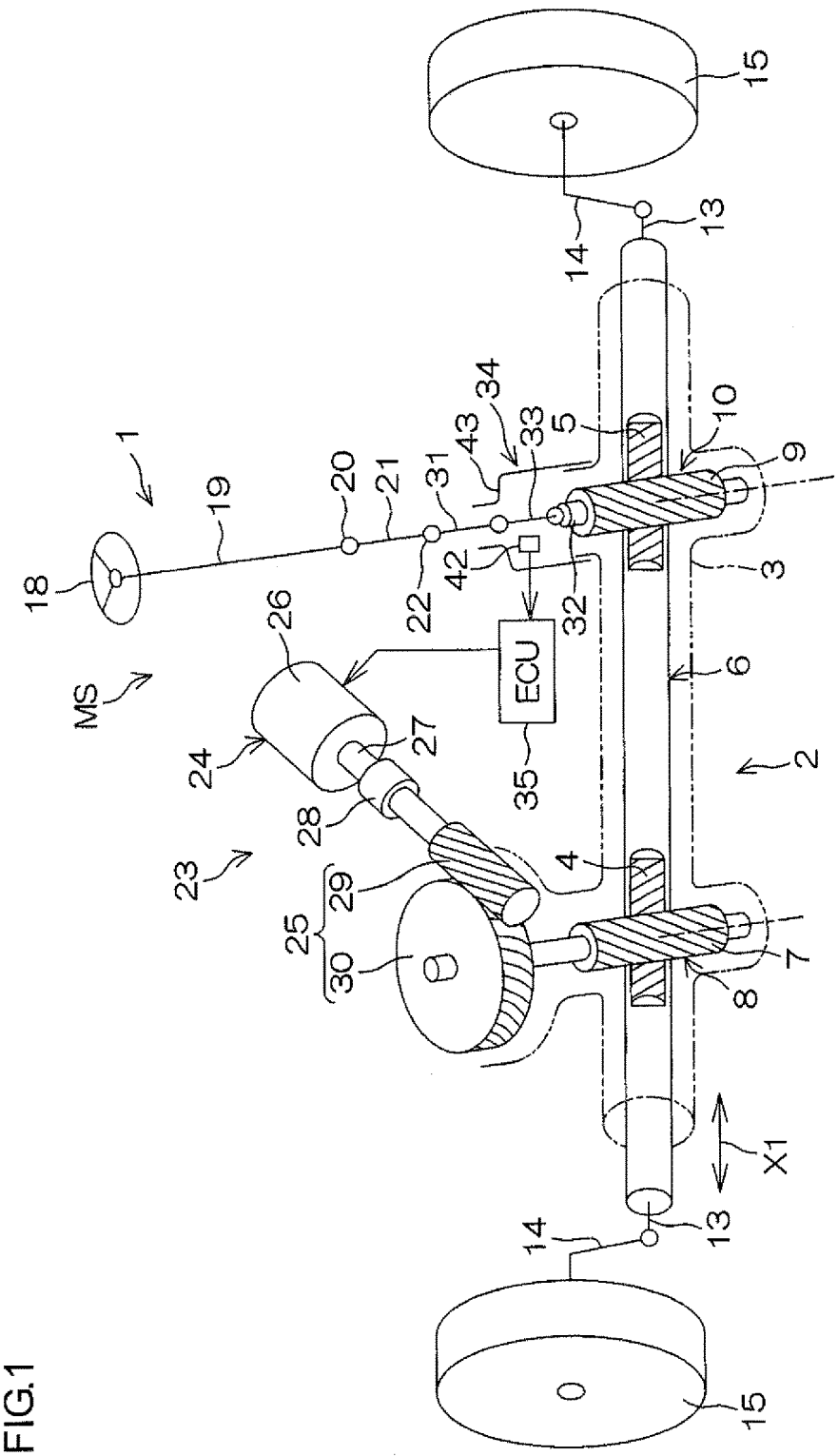
FIG. 1 is a schematic diagram depicting a general configuration of a steering system to which a torque detection apparatus in a first embodiment of the invention is applied.

FIG. 1 is a schematic diagram depicting a general configuration of a steering system 1 to which a torque detection apparatus 34 in a first embodiment of the invention is applied.

With reference to FIG. 1, the steering system 1 is, for example, an electric power steering system, and includes a steering operation mechanism 2 that is a rack-and-pinion mechanism. The steering operation mechanism 2 includes a rack shaft 6 and a first pinion shaft 8. The rack shaft is inserted through a tubular rack housing 3 fixed to a vehicle body, has a first rack 4 of a helical gear and a second rack 5 of a helical gear separated from each other in an axial direction X1, and serves as a steered shaft. The first pinion shaft 8 has a first pinion 7 of a helical gear that meshes with the first rack 4. The steering operation mechanism 2 also includes a second pinion shaft 10 and steered wheels 15. The second pinion shaft 10 has a second pinion 9 of a helical gear that meshes with the second rack 5. The steered wheels 15 are each coupled to a corresponding one of the two ends of the rack shaft 6 in the axial direction X1 via a tie rod 13 and a knuckle arm 14.

The second pinion shaft 10 is used to transmit a manual steering force and transmits, to the rack shaft 6, the manual steering force exerted on a steering member 18 such as a steering wheel by a driver. That is, the steering member 18 is coupled to the second pinion shaft 10 via a steering shaft 19, a universal joint 20, an intermediate shaft 21, and a universal joint 22 so as to be able to transmit a torque via these components.

The driver operates the steering member 18 to exert a manual steering force (steering torque), so that the steered wheels 15 are steered via the steering shaft 19, the universal joint 20, the intermediate shaft 21, the universal joint 22, the second pinion shaft 10, the rack shaft 6, the tie rods 13, and the knuckle arms 14. A manual steering system MS includes the steering member 18, the steering shaft 19, the universal joint 20, the intermediate shaft 21, the universal joint 22, the second pinion shaft 10, and the rack shaft 6.

The first pinion shaft 8 is used to transmit a steering assist force. The steering system 1 includes a steering assist mechanism 23. The steering assist mechanism 23 includes an electric motor 24 that generates a steering assist force, and a speed reducing mechanism 25 such as a worm gear mechanism which executes speed reduction on a rotation output from the electric motor 24 and transmits the resultant rotation output to the first pinion shaft 8.

The electric motor 24 includes a motor housing 26 and a rotating shaft 27 serving as an output shaft. The speed reducing mechanism 25 includes a drive gear 29 such as a worm shaft which is coupled to the rotating shaft 27 via a joint 28 so as to be able to transmit a torque, and a driven gear 30 such as a worm wheel which meshes with the drive gear 29 and which is coupled to the first pinion shaft 8 so as to be rotatable integrally with the first pinion shaft 8.

The second pinion shaft 10 has an input shaft 31 continuous with the intermediate shaft 21 via the universal joint 22, and an output shaft 32 on which the second pinion 9 is formed. The input shaft 31 and the output shaft 32 are concentrically coupled together via a torsion bar 33 serving as a coupling shaft so as to be rotatable relative to each other in a predetermined range of angles.

The torque detection apparatus 34 is attached to the input shaft 31 of the second pinion shaft 10 in the manual steering system MS. A torque detection signal from the torque detection apparatus 34 is provided to an electronic control unit (ECU) 35. The ECU 35 controllably drives the electric motor 24 via a built-in driving circuit based on the torque detection signal, a vehicle speed detection signal provided by a vehicle speed sensor (not shown), or the like. The output rotation from the electric motor 24 is subjected to speed reduction via the speed reducing mechanism 25. The resultant output rotation is transmitted to the first pinion shaft 8, where the output rotation is converted into linear motion of the rack shaft 6 to assist steering.

Figure 2:
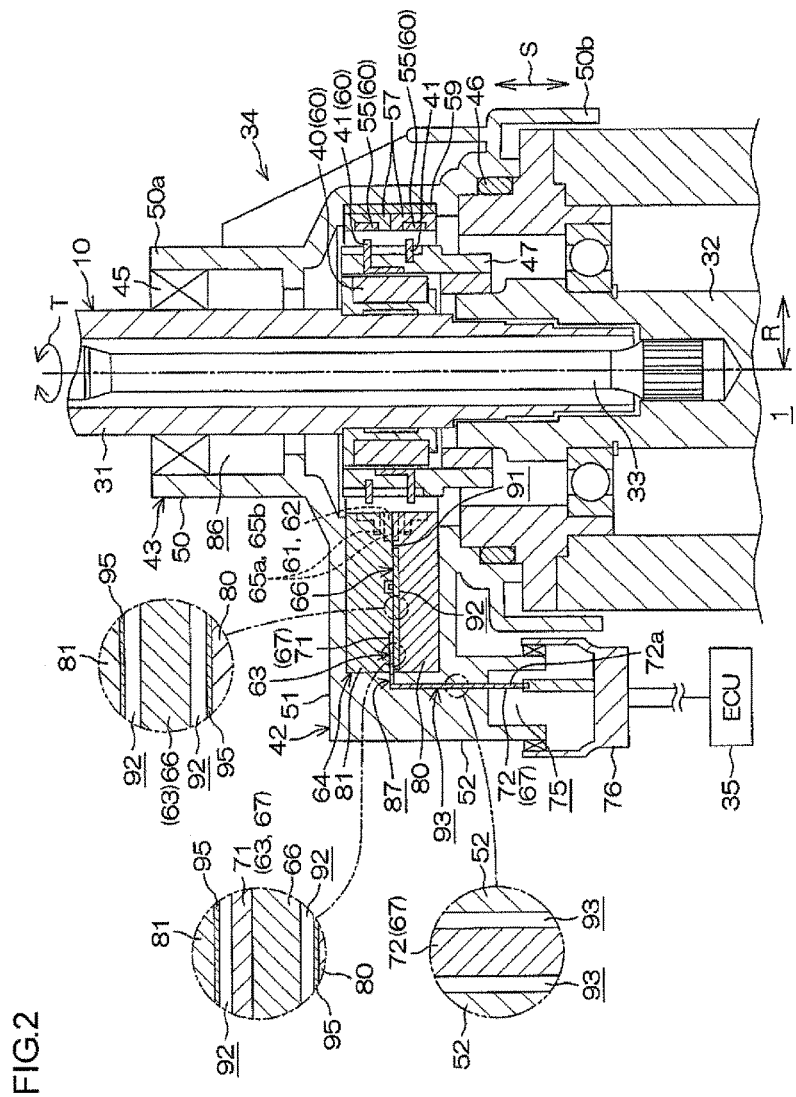
FIG. 2 is a sectional view of a periphery of the torque detection apparatus.

FIG. 2 is a sectional view of a periphery of the torque detection apparatus 34.

Components of the torque detection apparatus 34 will be described using an axial direction S, a radial direction R, and a circumferential direction T of the input shaft 31 of the second pinion shaft 10.

As seen in FIG. 2, the torque detection apparatus 34 includes a permanent magnet 40, a pair of magnetic yokes 41 magnetically coupled to the permanent magnet 40, and a sensor unit 42 that detects a magnetic flux from the magnetic yokes 41 and is electrically connected to the ECU 35. The torque detection apparatus 34 includes a unit housing 43 formed of resin and housing the permanent magnet 40 and the magnetic yokes 41 and formed integrally with the sensor unit 42 so as to cover the sensor unit 42, and a pair of sealing members 45 and 46 that seals a gap between the unit housing 43 and the second pinion shaft 10.

The unit housing 43 includes a tubular body portion 50 surrounding the input shaft 31 of the second pinion shaft 10 and provided with an internal space 86 in which the permanent magnet 40 and the magnetic yokes 41 are housed, a holder holding portion 51 extending from an outer peripheral surface of the body portion 50 like a protrusion, and a connector portion 52 extending from a protruding end of the holder holding portion 51 and provided with an internal space 75 in which a part of the sensor unit 42 is disposed. The body portion 50, the holder holding portion 51, and the connector portion 52 are formed of a single material and integrated together.

The first sealing member 45 is attached to an upper end 50a of the body portion 50 in an axial direction S, and is, for example, an oil seal. The second sealing member 46 is attached to a lower end 50b of the body portion 50 in the axial direction S, and is, for example, an O ring.

The permanent magnet 40 is shaped like a cylinder, and includes a plurality of poles, for example, 24 poles (12 N poles and 12 S poles) disposed at regular intervals in the circumferential direction T. The permanent magnet 40 is concentrically fixed to the input shaft 31 of the second pinion shaft 10 so as to rotate integrally with the input shaft 31.

The magnetic yokes 41 are formed of a soft-magnetic metal material that is a magnetic substance. The magnetic yokes 41 are molded using resin so as to form a tubular member 47. The tubular member 47 is concentrically fixed to the output shaft 32 so as to rotate integrally with the output shaft 32. The magnetic yokes 41 are disposed outside the permanent magnet 40 in the radial direction R so as to surround the permanent magnet 40 in a non-contact manner and to lie in a magnetic field formed by the permanent magnet 40. The magnetic yokes 41 rotate relative to the permanent magnet 40 in the circumferential direction T to change a relative position between the permanent magnet 40 and the magnetic yokes 41.

The sensor unit 42 is disposed around the magnetic yokes 41 in the radial direction with a gap therebetween.

Figure 3:
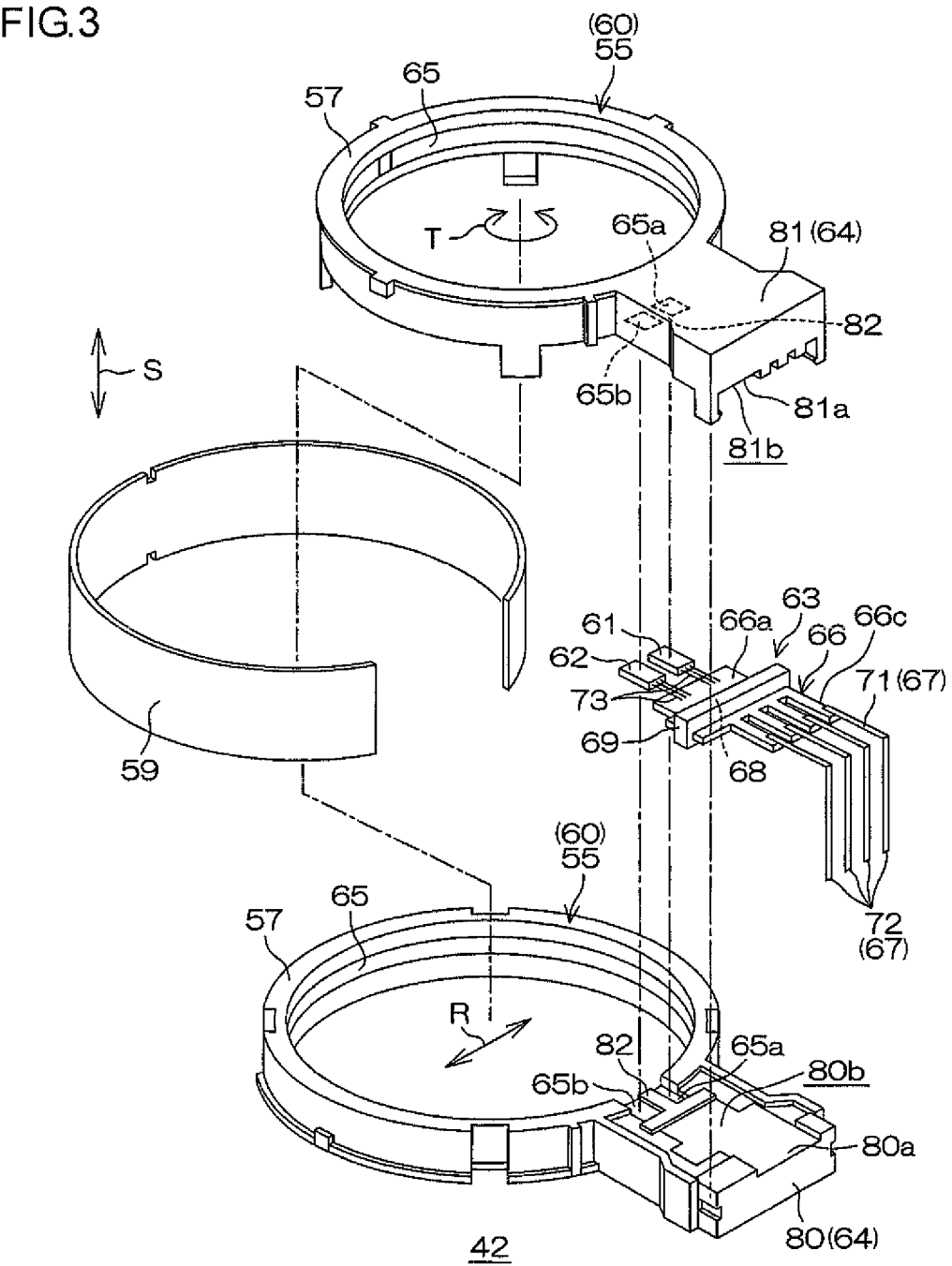
FIG. 3 is an exploded perspective view of a sensor unit.
Figure 4:
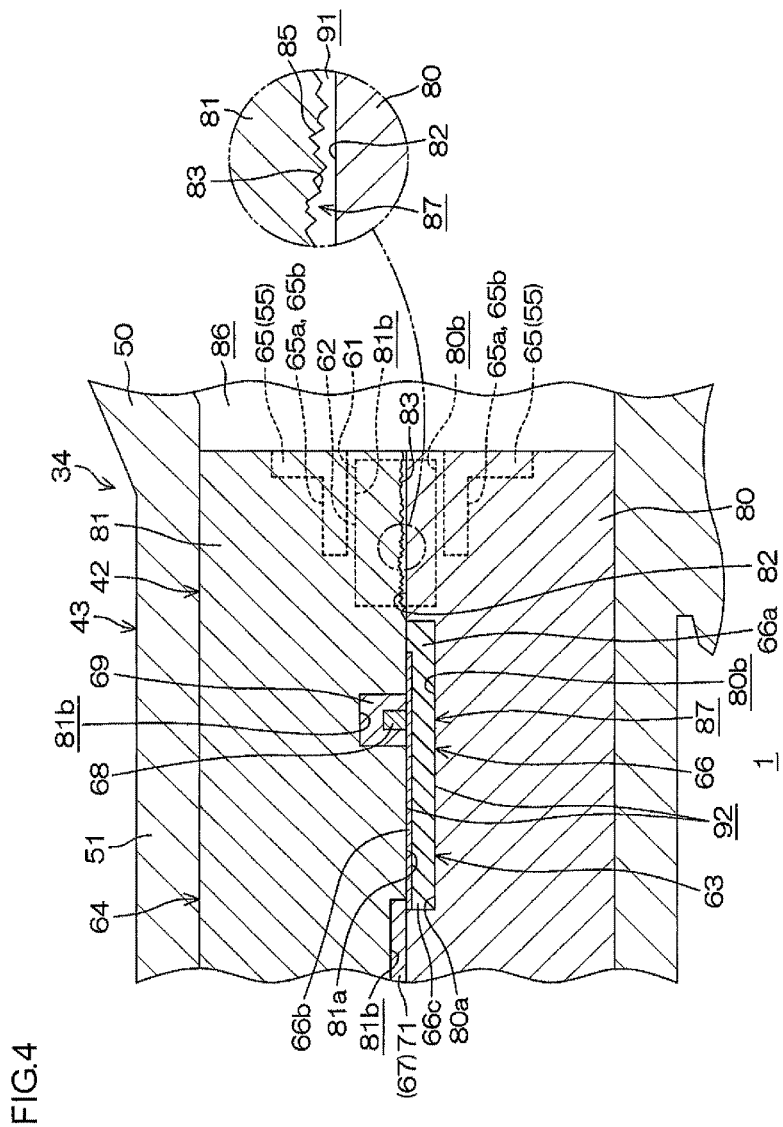
FIG. 4 is an enlarged view of a periphery of a holder holding portion in FIG. 2.

FIG. 3 is an exploded perspective view of the sensor unit 42. FIG. 4 is an enlarged diagram of a periphery of the holder holding portion 51 in FIG. 2.

As seen in FIG. 3, the sensor unit 42 includes a pair of magnetic collecting rings 55 magnetically coupled to the respective magnetic yokes 41 (see FIG. 2), a pair of magnetic collecting holders 57 holding the respective magnetic collecting rings 55, and a magnetic shield 59 that reduces adverse effects of an external magnetic field on a magnetic circuit 60 (see FIG. 2) including the magnetic collecting rings 55, the magnetic yokes 41, and the permanent magnet 40.

The sensor unit 42 includes a first magnetic element (magnetic element) 61 and a second magnetic element (magnetic element) 62 that output output signals corresponding to a magnetic flux from the magnetic circuit 60 including the permanent magnet 40 (see FIG. 2) and the magnetic yokes 41, a signal retrieval member 63 connected to the magnetic elements 61 and 62, and a holder 64 that houses and holds the magnetic elements 61 and 62 and a part of the signal retrieval member 63.

Each of the magnetic collecting rings 55 includes an annular portion 65, a first element facing portion 65a that protrudes from the annular portion 65 outward in the radial direction R so as to face the first magnetic element 61, and a second element facing portion 65b that protrudes from the annular portion 65 outward in the radial direction R so as to face the second magnetic element 62 (see also FIG. 4). Each of the magnetic collecting rings 55 is molded using the resin of the corresponding magnetic collecting holder 57 so as to integrate with the magnetic collecting holder 57, and is generally annular. Each of the magnetic collecting holders 57 and each of the magnetic collecting rings 55 lie outside the corresponding magnetic yoke 41 in the radial direction R so as to concentrically surround an outer periphery of the magnetic yoke 41 in a non-contact manner (see FIG. 2).

The magnetic shield 59 is C-shaped by bending one long plate formed of a magnetic metal material. The magnetic shield 59 is disposed around the magnetic collecting holders 57 (see FIG. 2).

The magnetic elements 61 and 62 are, for example, Hall ICs. The magnetic elements 61 and 62 otherwise do not appear on sectional views in FIG. 2 and FIG. 4, but for convenience of description, both magnetic elements 61 and 62 are depicted by dashed lines (this also applies to the first element facing portion 65a and the second element facing portion 65b). The magnetic elements 61 and 62 are disposed around the magnetic yokes 41 (see FIG. 2).

As depicted in FIG. 3 and FIG. 4, the first magnetic element 61 is disposed between the first element facing portions 65a of the magnetic collecting rings 55. The second magnetic element 62 is disposed between the second element facing portions 65b of the magnetic collecting rings 55.

As seen in FIG. 2, in the magnetic circuit 60, the magnetic collecting rings 55 guide, to the magnetic elements 61 and 62, a magnetic flux fluctuating in response to a change in the relative position between the permanent magnet 40 and each of the magnetic yokes 41.

As seen in FIG. 3, the signal retrieval member 63 includes a substrate 66, metallic terminals 67, and a capacitor 68. The substrate 66 includes an input portion 66a to which signals from the magnetic elements 61 and 62 are input, a mounting circuit 66b (see FIG. 4) to which the capacitor 68 is attached, and an output portion 66c that outputs a signal from the mounting circuit 66b to the terminals 67. The signal retrieval member 63 further includes pins 73 that couple the magnetic elements 61 and 62 to the input portion 66a and a cover 69 that covers the capacitor 68.

The terminals 67 are formed of metal, and each include a first portion 71 coupled to the output portion 66c of the substrate 66 and an angled second portion 72 that extends from the first portion 71. The second portion 72 includes a part that extends from an end of the first portion 71 opposite from the substrate 66 and on an extension of the first portion 71, and a part extending in the axial direction S from the above-described part where the second portion 72 is folded.

As seen in FIG. 2, the first portion 71 is housed and held in the holder 64. The second portion 72 extends outward from the holder 64. A distal end 72a of the second portion 72 that is an end of the signal retrieval member 63 is exposed from the resin forming the connector portion 52, and is disposed in the internal space 75 in the connector portion 52. The second portion 72 is housed in the connector portion 52. The second portion 72 is electrically connected to the ECU 35 and the like by connecting a watertight external connector 76 to the connector portion 52.

The holder 64 is formed of resin and shaped like a block. The holder 64 is integrated with the magnetic collecting holders 57 (see FIG. 3). The holder 64 is disposed around the magnetic yokes 41.

The unit housing 43 is formed by insert molding. Specifically, the sensor unit 42 including the holder 64 is disposed in a mold (not shown), and a resin is injected into the mold so as to cover an outer surface 64a of the holder 64 of the sensor unit 42. Thus, the unit housing 43 is molded integrally with the sensor unit 42 including the holder 64. Consequently, the holder 64 is housed and held in the holder holding portion 51 in close contact with the holder holding portion 51. The resin used for the insert molding of the unit housing 43 contains at least 15% and preferably 30% glass fibers.

As seen in FIG. 4, the holder 64 includes a pair of division members 80 and 81 disposed such that the division members 80 and 81 are in abutting contact with each other and sandwich the magnetic elements 61 and 62, the substrate 66 of the signal retrieval member 63, and the first portions 71 of the terminals 67 of the signal retrieval member 63. The first division member 80 is formed integrally with one of the magnetic collecting holders 57, and the second division member 81 is formed integrally with the other magnetic collecting holder 57 (see FIG. 3). Before insert molding of the unit housing 43, the second division member 81 is attached to the first division member 80 such that the magnetic elements 61 and 62, the first portions 71 of the terminals 67, the substrate 66, the capacitor 68, and the cover 69 are sandwiched between the first division member 80 and the division member 81.

The division members 80 and 81 have facing surfaces 80a and 81a, respectively, that face each other (see FIG. 3). On the facing surface 80a of the first division member 80, a recessed portion 80b is formed in which the magnetic elements 61 and 62 and the substrate 66 of the signal retrieval member 63 are disposed. On the facing surface 81a of the second division member 81, a recessed portion 81b is formed in which the magnetic elements 61 and 62, the capacitor 68, the cover 69, and the first portions 71 of the terminals 67 are disposed.

As seen in FIG. 4, a part of the facing surface 80a of the first division member 80 and a part of the facing surface 81a of the second division member 81 that are in abutting contact with each other are hereinafter referred to as a first abutting contact surface 82 and a second abutting contact surface 83, respectively. The second abutting contact surface 83 has a very small unevenness 85 in an area located between the magnetic elements 61 and 62 and extending from an end of the body portion 50 close to the internal space 86 to the position of the recessed portion 80b or the recessed portion 81b where the substrate 66 is disposed (see an enlarged view depicted in FIG. 4). The unevenness 85 is, for example, very small recesses and protrusions, specifically, holes, a knurled portion, a ridged pattern, depressions, or the like.

During the above-described insert molding, part of the molten resin enters the holder 64, that is, a portion between the division members 80 and 81 or between the signal retrieval member 63 and the holder 64. The molten resin is cooled after the insert molding and solidified inside the holder 64 where the molten resin has entered. Thus, the resin 95 having entered the holder 64 is interposed between the division members 80 and 81 and between the signal retrieval member 63 and the holder 64 after the insert molding (see enlarged views depicted in FIG. 2).

The unevenness 85 forms, between the abutting contact surfaces 82 and 83 of the division members 80 and 81, a very small first space 91 that is continuous enough to allow air to pass through (see the enlarged view in FIG. 4). A first end of the first space 91 is in communication with the internal space 86 in the body portion 50. The first space 91 has a size appropriate to preclude the resin from entering the first space 91 during the insert molding.

The first abutting contact surface 82 may also have the unevenness 85, and at least one of the abutting contact surfaces 82 and 83 may have the unevenness 85.

Since the resin containing the glass fibers has anisotropy in post-molding-shrinkage, during cooling after the insert molding of the unit housing 43, very small spaces 92 and 93 through which air can pass are formed between the signal retrieval member 63 and the molded resin as a result of the post-molding shrinkage of the resin.

Specifically, as seen in the enlarged views in FIG. 2, the second space 92 that is small enough to allow air to pass through is formed between the signal retrieval member 63 and the resin 95 having entered the holder 64. Specifically, the second space 92 is formed between the substrate 66 and the resin 95 and between the resin 95 and the first portions 71 of the terminals 67. The third space 93 that is small enough to allow air to pass through is formed between the resin forming the unit housing 43 and the signal retrieval member 63, specifically, between the resin forming the connector portion 52 and the second portions 72 of the terminals 67.

As seen in FIG. 2, a second end of the first space 91 with the first end thereof in communication with the internal space 86 in the body portion 50 is in communication with a first end of the second space 92. A second end of the second space 92 is in communication with a first end of the third space 93. A second end of the third space 93 is in communication with the internal space 75 in the connector portion 52.

Thus, the internal space 75 in the connector portion 52 is in communication with the internal space 86 in the body portion 50 through the first space 91, the second space 92, and the third space 93. The first space 91, the second space 92, and the third space 93 forms a communication path 87 through which the internal space 75 in the connector portion 52 is in communication with the internal space 86 in the body portion 50.

Figure 5:
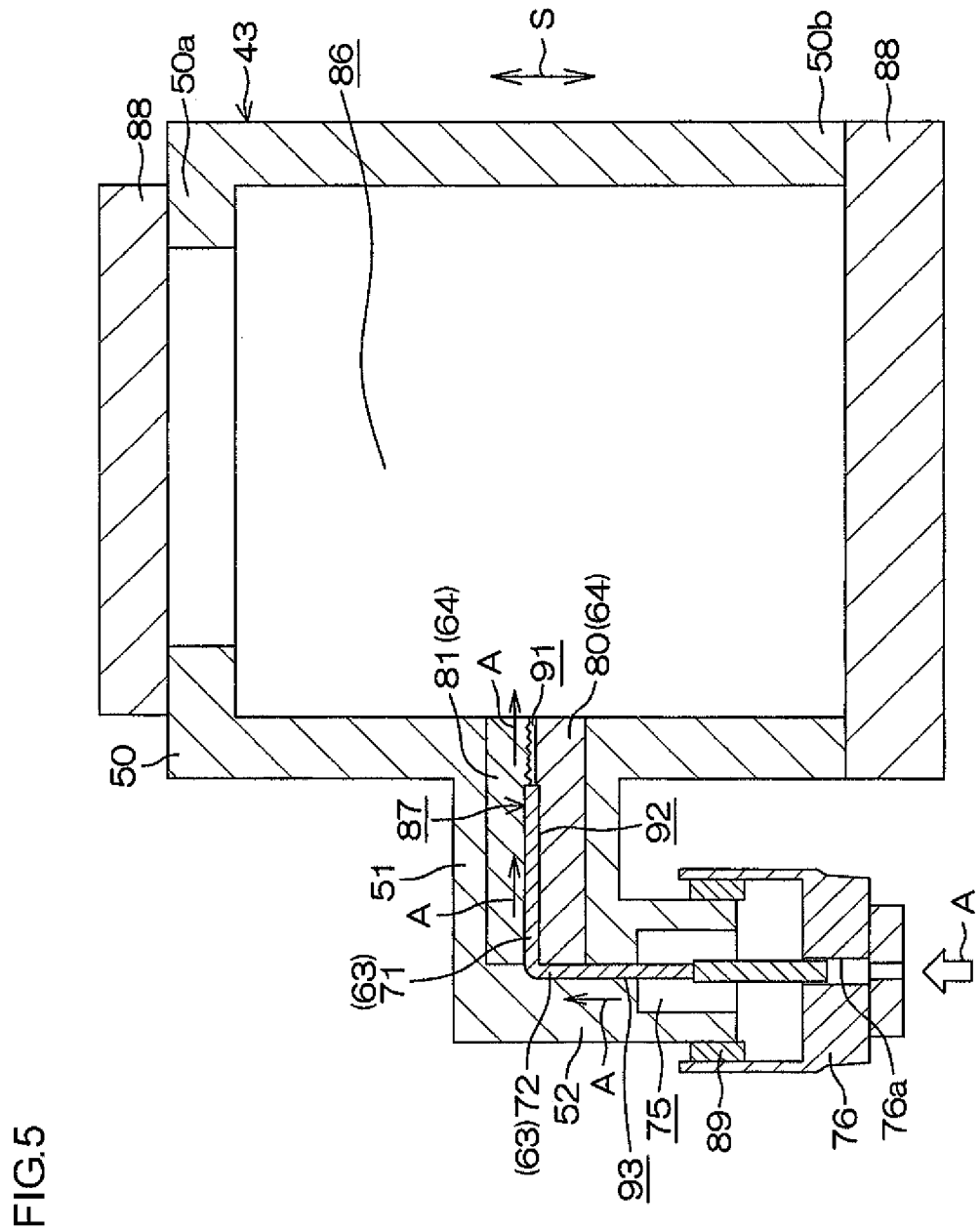
FIG. 5 is a schematic diagram illustrating a method for an airtightness test on a unit housing.

FIG. 5 is a schematic diagram illustrating a method for an airtightness test on the unit housing 43.

The method for the airtightness test on the torque detection apparatus 34 will be described with reference to FIG. 5. The torque detection apparatus 34 may be used in an engine room in a vehicle, and thus, the unit housing 43 needs to be watertight (airtight). Testing the unit housing 43 for airtightness needs testing for the airtightness of the body portion 50 of the unit housing 43 at the opposite ends 50a and 50b in the axial direction S and the airtightness between the watertight external connector 76 and the connector portion 52.

Before the airtightness test is conducted, the opposite ends 50a and 50b of the body portion 50 of the unit housing 43 are closed using a jig 88. Moreover, with the watertight external connector 76 fitted over the connector portion 52, the gap between the connector portion 52 and the external connector 76 is closed with an elastic member 89 interposed between the external connector 76 and the connector portion 52.

In this state, air A is fed into the internal space 75 in the connector portion 52 through a terminal insertion hole 76a in the external connector 76. The air A is also fed into the internal space 86 in the body portion 50 via the third space 93, the second space 92, and the first space 91 in order, that is, via the communication path 87. The unit housing 43 is determined to be sufficiently airtight as long as no air leaks from the portion between the jig 88 and the opposite ends 50a and 50b of the body portion 50 or between the connector portion 52 and the external connector 76.

In the first embodiment, the internal space 86 in the body portion 50 of the unit housing 43 is in communication with the internal space 75 in the connector portion 52 through the communication path 87. Thus, whether or not the unit housing 43 as a whole is appropriately airtight can be determined by one test. Consequently, as compared to a case where separate airtightness tests are conducted on the body portion 50 and on the connector portion 52, the first embodiment enables a reduction in the man-hour of the airtightness test on the unit housing 43.

When the unit housing 43 is formed, the molten resin is unlikely to flow into the first space 91 formed by the unevenness 85 formed on the at least one of the abutting contact surfaces 82 and 83 of the division members 80 and 81 of the holder 64. Therefore, the communication path 87 can be formed simultaneously with molding of the unit housing 43.

Since the resin 95 containing the glass fibers has anisotropy in post-molding shrinkage, the post-molding shrinkage of the resin 95 causes the second space 92 through which air can pass to be formed between the resin 95 having entered the holder 64 and the signal retrieval member 63 (the first portions 71 of the terminals 67 and the substrate 66). Thus, the communication path 87 can be easily formed in the unit housing 43.

Post-molding shrinkage of the resin containing the glass fibers causes the third space 93 through which air can pass to be formed between the resin forming the unit housing 43 including the connector portion 52 and the signal retrieval member 63 (the second portions 72 of the terminals 67). Thus, the communication path 87 can be easily formed in the unit housing 43.

Figure 6:
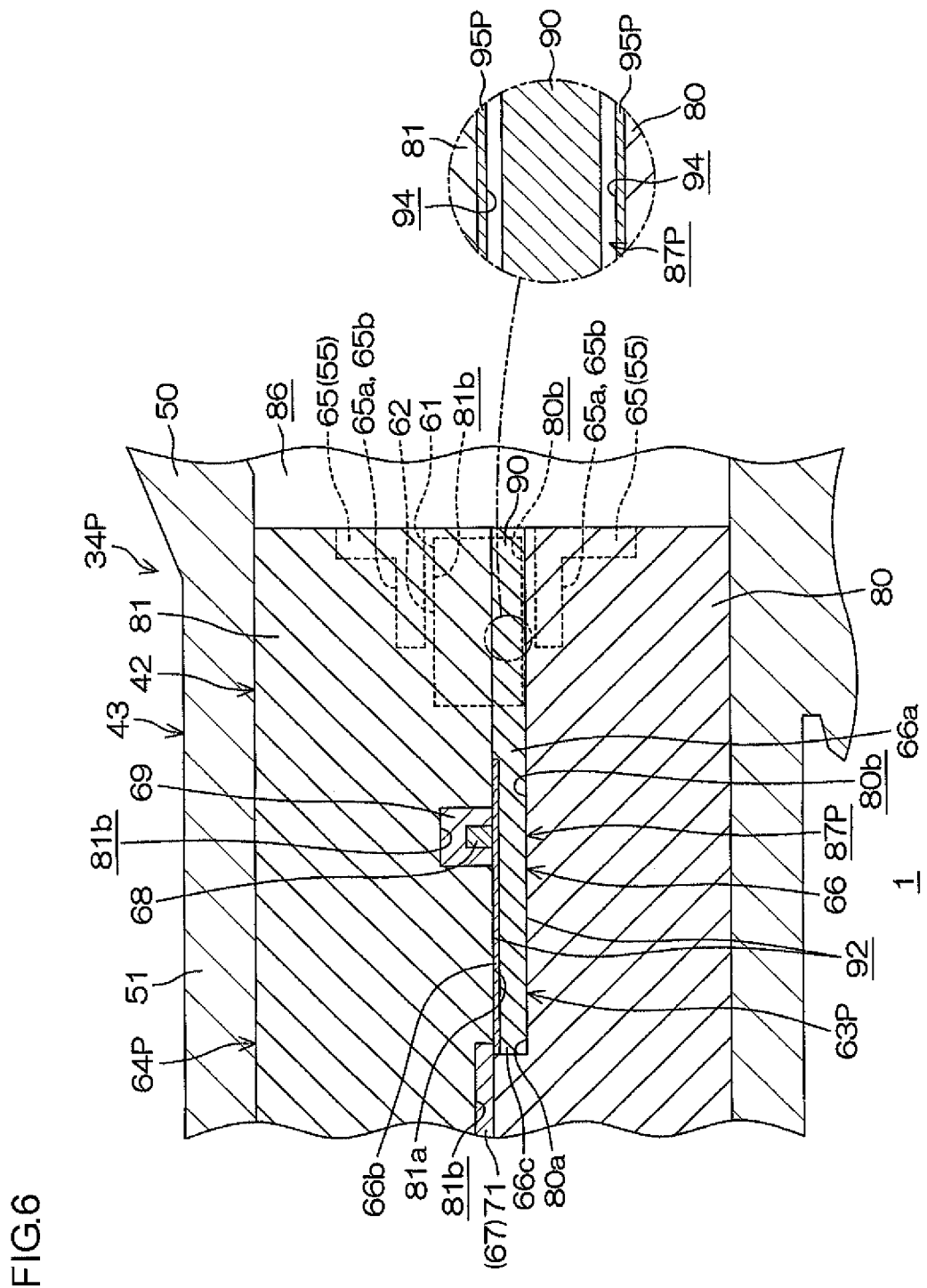
FIG. 6 is a diagram depicting a main part of a torque detection apparatus in a second embodiment of the invention.
Figure 7:
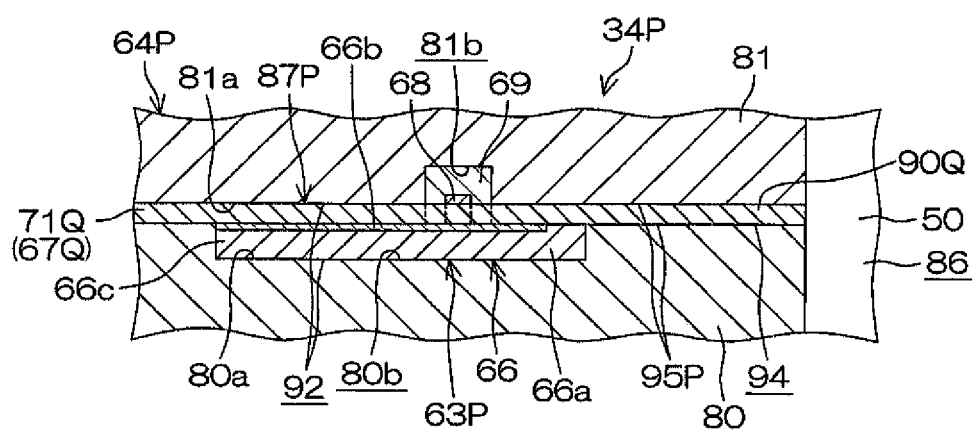
FIG. 7 is a schematic diagram of a main part of a torque detection apparatus in a variation of the second embodiment.

FIG. 6 is a diagram depicting a main part of a torque detection apparatus 34P in a second embodiment of the invention. FIG. 7 is a schematic diagram of a main part of the torque detection apparatus 34P in a variation of the second embodiment.

As seen in FIG. 6, a holder 64P in the second embodiment is different from the holder 64 in the first embodiment in FIG. 4 chiefly in that a signal retrieval member 63P includes an extension portion 90 extending from an end of the substrate 66 close to the internal space 86 to reach an interior of the internal space 86 in the body portion 50, and the division member 80 or 81 does not have the unevenness 85 for the first space 91 but the recessed portions 80b and 81b are formed to allow the extension portion 90 to be disposed in the recessed portions 80b and 81b. The extension portion may be formed by extending the substrate 66 as in the case of the extension portion 90 depicted in FIG. 6 or by extending first portions 71Q of terminals 67Q as in the case of an extension portion 90Q depicted in FIG. 7. Members of the second embodiment that are similar to those of the first embodiment are denoted by the same reference numerals and will not be described.

To be exact, a distal end of the extension portion 90 extends to a position where the extension portion 90 is flush with an inner peripheral surface of the body portion 50 of the unit housing 43.

In the second embodiment, a fourth space 94 is formed between a resin 95P having entered the holder 64P and the extension portion 90. In the second embodiment, the first space 91 formed by the unevenness 85 (see FIG. 4) is not formed between the division members 80 and 81, and the fourth space 94 is included in a communication path 87P instead of the first space 91.

In the second embodiment, the internal space 86 in the body portion 50 of the unit housing 43 is in communication with the internal space 75 in the connector portion 52 through the communication path 87P. Thus, whether or not the unit housing 43 as a whole is appropriately airtight can be determined by one test. Consequently, as compared to a case where separate airtightness tests are conducted on the body portion 50 and on the connector portion 52, the second embodiment enables a reduction in the man-hour of the airtightness test on the unit housing 43.

Post-molding shrinkage of the resin containing the glass fibers causes the fourth space 94 through which air can pass to be formed between the resin 95P and the extension portion 90 reaching the interior of the internal space 86 in the body portion 50 of the unit housing 43. Thus, the communication path 87P can be easily formed in the unit housing 43.

Even in a configuration in which a resin wall is formed between the holder 64P and the internal space 86 in the body portion 50 by insert molding, the fourth space 94 is formed between the extension portion 90 and the resin 95P or the resin forming the resin wall as long as the extension portion 90 extends into the internal space 86 in the body portion 50. In this case, the second space 92, the third space 93 (see FIG. 2), and the fourth space 94 form the communication path 87P. Thus, the communication path 87P allows the internal space 86 to communicate with the internal space 75 (see FIG. 2) in the connector portion 52.

The invention is not limited to the above-described embodiments but various changes may be made to the embodiments.

For example, the communication path 87 in the first embodiment is formed by the first space 91, the second space 92, and the third space 93, and the communication path 87P in the second embodiment is formed by the second space 92, the third space 93, and the fourth space 94. However, the combination of the spaces forming the communication path 87 is not limited. The communication path 87 may be optionally formed by at least one of the first space 91, the second space 92, the third space 93, and the fourth space 94, or a combination of any of these spaces.

The holder 64 may be omitted from the sensor unit 42 of the torque detection apparatus 34. In this case, the communication path 87 is formed by the space between the signal retrieval member 63 and the resin forming the unit housing 43, that is, only by the third space 93.

When the unit housing 43 is formed by insert molding, the communication path 87 may be formed using a slide mold that slides in a different direction from directions in which an upper mold and a lower mold (not shown) opens. Specifically, when the unit housing 43 is formed by insert molding, a pin-like slide mold is placed in the mold at a predetermined position, and the slide mold is pulled out after molding of the unit housing 43, so that the communication path 87 is formed. The slide mold may be used to form, as a part of the communication path 87, the space extending from an end of the substrate 66 of the signal retrieval member 63 that is close to the internal space 86 in the body portion 50 to the internal space 86.

In the above-described embodiments, the unit housing 43 is molded using the resin containing the glass fibers. However, a resin containing an inorganic filler may be used. A resin containing no glass fibers or inorganic filler may be used when the communication path 87 is formed by utilizing only the first space 91 formed by the unevenness 85 on the abutting contact surface 82 or 83 or by using a slide mold.

What is claimed is:

1. A torque detection apparatus comprising:
   a permanent magnet in which magnet poles are arranged in a circumferential direction;
   a magnetic yoke formed of a magnetic substance and disposed in a magnetic field formed by the permanent magnet so as to surround the permanent magnet, the magnetic yoke rotating relative to the permanent magnet to change a relative phase between the permanent magnet and the magnetic yoke;
   a magnetic element disposed around the magnetic yoke to output a signal corresponding to a magnetic flux from a magnetic circuit including the permanent magnet and the magnetic yoke;
   a signal retrieval member electrically connected to the magnetic element; and
   a unit housing that is formed of resin, houses the permanent magnet and the magnetic yoke, and that is molded integrally with the magnetic element and the signal retrieval member so as to cover the magnetic element and the signal retrieval member; wherein
   the unit housing includes a body portion provided with an internal space in which the permanent magnet and the magnetic yoke are housed; and
   a connector portion provided with an internal space in which an end of the signal retrieval member exposed from the resin is disposed, and
   in the unit housing, a communication path is formed through which the internal space in the body portion is in communication with the internal space in the connector portion, the communication path being adapted to allow air to pass from the internal space in the body portion to the internal space in the connector portion.

2. The torque detection apparatus according to claim 1, further comprising:
   a holder disposed around the magnetic yoke to house the magnetic element and the signal retrieval member; wherein
   the holder includes:
   a first division member; and
   a second division member attached to the first division member so as to sandwich the magnetic element and the signal retrieval member between the first division member and the second division member,
   the resin of the unit housing covers an outer surface of the holder such that the unit housing is formed integrally with the holder,
   at least one of abutting contact surfaces of the respective first and second division members has an unevenness which forms a first space of a size appropriate to preclude the resin of the unit housing from flowing in a portion between the first division member and the second division member during molding, and
   the communication path includes the first space.

3. The torque detection apparatus according to claim 2, wherein
   the resin of the unit housing contains at least glass fibers or an inorganic filler, and
   the communication path includes a second space formed between the resin of the unit housing that has entered the holder and the signal retrieval member.

4. The torque detection apparatus according to claim 1, wherein
   the resin of the unit housing contains at least glass fibers or an inorganic filler, and
   the communication path includes a third space formed between the resin of the unit housing and the signal retrieval member.

5. The torque detection apparatus according to claim 1, wherein
   the resin of the unit housing contains at least glass fibers or an inorganic filler,
   the signal retrieval member includes an extension portion that reaches an interior of the internal space in the body portion, and
   the communication path includes a fourth space formed between the resin of the unit housing and the extension portion.

* * * * *